United States Patent [19]

Paschke et al.

[11] 4,263,403

[45] Apr. 21, 1981

[54] METHOD OF EXTRACTING URANIUM FROM SEA WATER

[75] Inventors: Manfred Paschke; Klaus Wagener; Maximilian Wald, all of Jülich, Fed. Rep. of Germany

[73] Assignee: Kernforschungsanlage Jülich Gesellschaft mit beschränkter Haftung, Jülich, Fed. Rep. of Germany

[21] Appl. No.: 24,957

[22] Filed: Mar. 29, 1979

Related U.S. Application Data

[63] Continuation-in-part of Ser. No. 818,580, Jul. 25, 1977, abandoned, which is a continuation-in-part of Ser. No. 664,371, Mar. 5, 1976, abandoned.

[30] Foreign Application Priority Data

Mar. 7, 1975 [DE] Fed. Rep. of Germany ....... 2509943

[51] Int. Cl.$^3$ ............................................... C12N 15/00
[52] U.S. Cl. ...................................... 435/172; 423/3; 210/601; 210/611; 210/912; 47/1.4
[58] Field of Search ............... 435/172, 243, 245, 262; 47/1.4, 58; 210/1, 2, 11, 150; 423/3

[56] References Cited

U.S. PATENT DOCUMENTS

| | | | |
|---|---|---|---|
| 3,540,589 | 11/1970 | Boris | 210/150 |
| 3,880,716 | 4/1975 | Engelbart | 435/106 |
| 4,039,445 | 8/1977 | Heide | 210/38 C |

OTHER PUBLICATIONS

Zajic et al., "Recovery of Heavy Metals by Microbes", Dev. in Ind. Micro., vol. 13, Garmond/Pridemark Pees, Baltimore, (1972), pp.91–100.

Heide et al., "Extraction of Uranium from Sea Water by Cultured Algae", Natur Wissenschaften, vol. 60, (1973), p. 431.

Jilek et al., "Removing Uranium From Mine Waters and Wastes From Hydrometalurgical Process", Chemical Abstracts, vol. 82, (1975), p. 266, Abs. No. 174984g.

Jilek et al., "Removing Uranium Compounds From Waste Mine Waters", *Chemical Abstracts,* vol. 82, (1975), p. 266, Abs. No. 174985h.

*Primary Examiner*—Ernest G. Therkorn
*Attorney, Agent, or Firm*—Becker & Becker, Inc.

[57] ABSTRACT

A method of producing a matrix of micro-organisms for extracting and gaining uranium from sea water, according to which the matrix is made of micro-organisms occurring in nature that are exposed to x-ray irradiations. These predetermined micro-organisms accordingly form colonies or threads and are filtered easily and cultivated. These micro-organisms accordingly form colonies or threads and are filtered easily and cultivated. These micro-organisms have a ratio of surface to volume that is relatively high. Subsequently, the thus irradiated micro-organisms are placed on a nutrient medium rich in uranium and are left there until colonies are formed. Thereupon, the surviving colonies of mutants are inoculated in a nutrient solution, and are then cultivated to produce the matrix.

9 Claims, No Drawings

METHOD OF EXTRACTING URANIUM FROM SEA WATER

This is a continuation-in-part of application Ser. No. 818,580-Heide et al filed July 25, 1977, now abandoned, which was a continuation-in-part of application Ser. No. 664,371-Heide et al, filed Mar. 5, 1976, now abandoned.

The present invention relates to a method of producing a matrix of micro-organisms of a certain type according to which said micro-organisms are irradiated by means of X-rays whereupon the X-rayed micro-organisms are conveyed to an intense uranium containing nutritive substratum or nutrient medium and are left there until the formation of colonies occurs. Subsequently, thereto, the colonies of surviving mutants are inoculated in a nutrient solution and further cultivated in a customary manner.

According to a non-prepublished suggestion, it has been suggested to irradiate monocellular green algae by means of X-rays and subsequently to place the irradiated green algae on a nutrient solution rich in uranium and to leave said algae there until colonies form. According to a further method step and in conformity with said non-prepublished suggestion, the colonies of surviving mutants are inoculated in a nutrient and then further cultivated in a customary manner, whereupon the stems or tribes particularly suitable for enriching uranium are isolated. From the thus treated monocellular green algae, a matrix is produced, and this matrix is arranged in a filter cage which for purposes of obtaining uranium from the sea water is exposed to the sea water in such a way that the sea water is passed through the filter cage containing the matrix.

The present invention, however, is based on the surprising finding that not only monocellular green algae as micro-organisms are suitable for extracting uranium from the sea water, but that all micro-organisms are suitable for this purpose which form threads or colonies, are adapted to be cultivated, and can easily be filtered, and with which the ratio of surface to volume is great.

It is, therefore, an object of the present invention to provide other micro-organisms than monocellular green algae, which can be made more easily available under respective prevailing circumstances to thereby considerably increase the economy of extracting uranium from the sea water.

These objects and other objects and advantages of the invention have been realized while utilizing the above outlined steps by using easily filterable micro-organisms which can be cultivated and which form colonies or threads and with which the ratio of surface to volume is great. The dosage of the applied X-ray irradiation is expediently about 50 kr (kilo-roentgen). From the thus formed matrix, the tribes of the micro-organisms utilized are picked which are particularly suitable for enriching uranium. From these tribes there is first formed a mass culture, and subsequently the matrix obtained in this manner is arranged in a filter cage with at least two oppositely located walls formed by screens which are permeable for sea water but impermeable for the formed mutants. Thereupon, the sea water is passed through the filter cage. The separation of the uranium from the matrix is carried out by means of customary steps which are dependent on the utilized micro-organisms.

A very advantageous step of the method according to the invention consists in that prior to the irradiation, individual cells are formed from the micro-organisms which are used for the formation of the matrix. This is carried out by varying or changing outer conditions, in other words, by a change in the solution which contains the micro-organisms or by a change in the osmolarity of the solution. The formation of individual cells can also be effected for instance by a change in the temperature of the culture or by the addition of enzymes. It has been found that by the formation of individual cells, the effectiveness of the matrix is increased.

Blue algae of the type oscillatoria have proved to be very suitable micro-organisms. Blue algae of the above mentioned type are particularly suitable because their thread-like character and the interweaving of the threads with each other with blue algae permit the utilization of filter cages, the mesh of which amounts to more than 50 $\mu$m. Blue algae frequently have a length of a plurality of millimeters but have only a diameter of one $\mu$m, and thus have a great surface with regard to its volume. By utilizing blue algae of the mentioned type, the extraction of uranium from the sea water is considerably more economical with utilization of monocellular green algae.

A further very suitable micro-organism for carrying out the method according to the invention is the mushroom *Aspergillus niger*. With submerse culture when whirling air through the culture containing vessel, ball-shaped sod (resin) forms which is distinguished by an extremely large surface.

EXAMPLE:

The said mushroom which normally grows is sweet water nutrient solution for carrying out the method according to the invention first was adapted to the osmolarity of the sea water by means of $NaNo_3$ occurring in ordinary nutrient solution. The cultures adapted in this manner were subsequently further cultivated in a nutrient solution which in sea water contained the normal nutrient salt concentration (see Czapek-Dox-Flüssignährboden, Oxoid-Handbuch 1967, Page 81). As sea water there was used Helgoland deep water (geographical location in the sea along the north coast of West Germany). If the thus cultivated mushrooms are introduced in synthetic sea water which contains 6 ppb uranium, it is possible after 24 hours in the mushroom dry mass to prove a uranium content which amounts to from 20 to 40 mg per kg.

It may also be added that while with the method according to the invention the time period over which the micro-organisms are exposed to X-rays may vary in conformity with various factors for instance the dimensions of the vessel containing the micro-organisms and the density of the micro-organisms in the vessel, however, an average of one hour has proved satisfactory.

The teaching of the present invention is not for a particular micro-organism, but rather for utilization of micro-organisms known in nature utilized for a particular purpose, namely for gaining of uranium. Before these organism occurring in nature are used, only a selection is required in accordance with steps necessary for doing so which are states in the description of the present invention.

The selection procedure itself must be emphasized rather than the utilization of organisms selected according to this method. This fact must be kept in mind.

Concerning dosing considered to mean the utilization of the designation kR, then R is the abbreviation for the unit "Röntgen" (Roentgen unit or radio). Thus R represents an internationally recognized measure unit having predetermined radiation dosage which is defined as a radiation dose of a predetermined size or magnitude. kR accordingly means as generally and conventionally stated 1000R. Thus the radiation dose is sufficiently defined beyond any doubt. As a precautionary measure in this connection, also attention is directed to the last paragraph of the sample embodiment; in this text location there is set forth one hour as the average duration of radiation.

As to the sample embodiment, the following additional comments are provided:

The characteristics of the mushroom *Aspergillus niger* are known. These characteristice can be found in every text of biology where the known meaning thereof can be read. Since an occurrence in nature is involved, no statement is necessary concerning breeding thereof. The composition of synthetic sea water is well known and recognized to be considered sufficiently disclosed. The composition of sea water belongs to the knowledge of the average man skilled in the art involved with the present disclosure. This is equally true for the composition of the Helgoland deep water. If essential, the necessary statements can be found by referring to prior publications belonging to the state of the art related to this subject. Finally, a question may arise why there must be set forth whether for example the uranium contained in the sea water is taken up or absorbed by the utilized micro-organisms or whether the uranium contained in the sea water adheres thereto or is combined therewith. The method according to the present invention as set forth in the text consists of gaining uranium from sea water through utilization of micro-organisms. This gaining of uranium from sea water by use of micro-organisms occurs in such a manner that a matrix is formed of these micro-organisms. There may be true that there is not expressly stated in which manner the separation of uranium and algae is to occur. Such statement concerning how the separation of uranium and algae occurs would not be necessary because there is self-understood for every expert or average man skilled in this particular art knows full well how this is to occur. An average man skilled in the art or the expert skilled in this art needs to proceed only on the basis that algae are organic and accordingly dried, in other words, combustible substance; uranium, however, is a metal which does not melt in the combustion temperatures involved. Consequently there is readily apparent for the average man skilled in the art or in other words, for the expert in this field to know how and in which manner the separation is to be undertaken.

The present invention involves a method for production of a matrix of cultivatable micro-organisms and does not involve breeding of micro-organisms.

Indisputable with the word matrix, there is to be understood a substance as set forth in the entire text of the present invention; this substance of the matrix is provided as the mother substance for the uranium to be taken up or gained thereby. Accordingly, the use of the concept "matrix" goes back to its original meaning as conventional also in the technique, for example with the embedding of fissionable material in a base substance with fuel elements for nuclear reactors. The use of the expression "matrix" is in agreement with the terminology conventional in the technique involved herewith.

The expression "in a customary manner" can be taken to refer to the cultivating as described in a co-pending application Ser. No. 674,109-Erich-Alexander Heide et al filed Apr. 6, 1976, now U.S. Pat. No. 4,039,445-Heide et al issued Aug. 2, 1977. The present disclosure is considered to be a supplement or addition to that of U.S. Pat. No. 4,039,445-Heide et al, issued Aug. 2, 1977 as far as the disclosure thereof is concerned. An essential part of the present invention is not anticipated by a reference (Heide et al in 1973) concerning "Extraction of Uranium from Sea Water by Cultured Algae" (Natur-wissenschaften, Vol. 60, page 431). The reference expresses only that single cell green algae take up uranium. No method at all, however, is disclosed by the reference as to how uranium is to be gained from sea water by means of algae, let alone there being any basis for the expert or average man skilled in the art to learn therefrom that a matrix is to be formed of cultivated micro-organisms with which the ratio to the upper surface to the volume is great. This, however, is an essential part of the invention and a further essential part of the invention consists therein that blue algae of the genus oscillatoria as organisms form colonies or threads. Eventually there are to be used mutants occurring in nature and is in complete agreement with what has been stated in the foregoing. It is correct that algae are capable of taking up uranium. The statements included in these references, however, represent only a scientific recognition, but these statements do not provide any directions whatever concerning what must occur in order to gain uranium from sea water. In order to provide this teaching, there is required the further recognition that a matrix must be formed of micro-organisms suitable for taking up uranium and to attain a gain or efficiency sufficient for the practice of the invention, there is required utilization of a very particular micro-organism. The present application provides a teaching for the expert or average man skilled in the art on how he should proceed.

Finally, there is not correct when a position is taken that use of a filter cage is obvious from U.S. Pat. No. 3,540,589-Boris issue Nov. 17, 1970. The position is not correct because the apparatus of Boris represents a drum which is to serve for purifying of impure water. The impure water and the bacteria (aerobic) requiring the oxygen in the presence of air are to be brought in close contact with each other. For this purpose, a filling of so-called Raschig rings is contained in the drum. Already the object to be resolved by this apparatus differs from the object that is the basis of the present invention to such a considerable extent that both disclosures are to be considered to belong to entirely different fields of endeavor. This is true most of all for the apparatus itself and finally also for the type and manner in which the apparatus is to be used. No one can gain from Boris the teaching that a matrix is to be formed of predetermined algae for gaining of uranium as provided in accordance with the present invention. This is true also if there is known that algae exist which are capable of taking up uranium; an expert or average man skilled in the art having knowledge of these references receives information of Boris that there is important to use the apparatus as set forth in the description of the cited reference. No basis seems to exist for deriving therefrom the teaching of the present invention.

The disclosure of U.S. Pat. No. 3,880,716-Engelbart issued Apr. 29, 1975 is even more remote that what is known from the prior art references and accordingly, no further detailed consideration thereof seems necessary at this time.

The basis for "mutants" and irradiated micro-organisms results from exposing to X-rays.

The German concept "Tiefenwasser" can be translated more specifically to refer not only to "deep water" but rather also "deeper water at greater depth" or "deeper depth water". The wording "deep water" could be misunderstood; what is means is water in deeper layers and not merely in the designation of the upper surface layer. Water from the deeper layers can also be designated in English as "water at greater depth" or water from "profundal zones".

The teaching of the present invention is not the breeding of particular mutants but rather formation or production of a matrix out of such algae branches or stems which are suitable for gaining of uranium. For this purpose, there is used a selection method as set forth in the introductory paragraphs of the present case and the method steps are believed to be set forth with sufficient accuracy for the expert or the average man skilled in the art. Breeding of mutants is not involved and a method of selecting is to be considered wherein the essence of the present invention exists. There should be made clear that the concern involves a selection method and not a breeding method with the measures which exist prior to the formation of the matrix.

The foregoing should make clear that it is erroneous to believe that the mutations are essential for the invention. As to the adaption of *Aspergillus niger* on sea water, the designated adaption here means that normal *Aspergillus niger* was cultivated in salt water. There can be proceeded on the basis that this self-understood method is known to the expert or average man skilled in the art.

With respect to the utilization of the designation "k", the civilized world knows that "k" is the abbreviation for "kilo" and that $10^3$ represents the measuring unit for which it is used as is the case here also.

*Aspergillus niger* has known characteristics and these characteristics of the mutants of *Aspergillus niger* have not been cited.

Comments have been made that the teaching of the present invention does not involve breeding of particular mutants; moreover, there does not seem necessary that characteristics thereof should have to be repeated in this disclosure since the same are considered to be known and otherwise every concept used in the description would have to be explained in detail over and over again.

The triggering of mutation undertaken through irradiation which itself is not the teaching of the present invention belongs to the textbook knowledge and accordingly belongs to the basic knowledge of every expert or man skilled in the art. Moreover, the same can be considered to be self-understood in that when a living thing is to be accustomed to new environmental conditions, the same must be subjected to such conditions whereby the intermediate steps are capable of being selected freely, however, likewise belonging to the knowledge of the expert or man skilled in the art, so that no further details would seem to be necessary concerning the same.

What is to be understood by the word "matrix" can be ascertained from every suitable dictionary. There is apparent that the concern here involves a matrix which refers to a substance. Reference is made to a cell matrix. There is believed to be no other way for designating a mass joined as formed of algae (or other material) with which the formation or giving of form is not to be considered at all or should be considered first in a secondary manner. Possibly the closest meaning as to what is to be understood with the wording of matrix can be set forth therein that the concern must involve "agglomerated micro-organisms". This, however, is sufficiently clear from the description of the present invention.

Breeding of micro-organisms cannot be considered to be the teaching of the present invention, but rather the passing of uranium containing sea water through the matrix in the filter cage represents an entirely different measure than the formation of the matrix out of particular micro-organisms which have been pretreated in the manner set forth.

The reference to the concept "micro-organisms to form threads" may be based upon a misunderstanding. The concept as set forth involves the language of the expert in biology. The concept "filamentous" might be considered in place thereof.

The following statements about composition of synthetic sea water can be found in every reference work, for instance, Dr. O. -A. Neumüller "Rompps Chemie-Lexikon", Band 4, Franck'sche Publishing House, 7. Edition, Stuttgart, 1974, Page 2095.

| | |
|---|---|
| 7.0 g | $MgSO_4 \cdot 7 H_2O$ |
| 5.0 g | $MgCl_2 \cdot 6 H_2O$ |
| 0.2 g | $NaHCO_3$ |
| 2.4 g | $CaCl_2 \cdot 6 H_2O$ |
| 28.0 g | NaCl |

The foregoing composition dissolved in 985 ml distilled water provides 1 liter of synthetic sea water.

The invention proceeds on the basis that it is known in the state of the art to form a matrix of micro-organisms of a particular type. With the wording "type" there is to be understood a group of living things selected according to common biological features (in English: genus, order or species).

Also belonging to the known state of the art is the radiation of micro-organisms of every particular type by means of x-ray beams, to bring the micro-organisms accordingly, on to the nutrient base strong in uranium content, to leave the micro-organisms through for colony formation and subsequent thereto to inoculate over the colonies which have outlived or survived this procedure now injected into a nutrient solution. This procedure serves to select the nutrient colonies which are usable for the inventive method. Under these circumstances, it is entirely immaterial which other characteristics the mutants have which are selected in this manner. Important is only that subsequent to the first selection procedure, namely a particular type of organism is used, that a second selection procedure is undertaken. It consists therein now to select the micro-organisms which survive the aforementioned measures. As a consequence thereof the statements which relate to mutants are believed to be unnecessary other than that the second selection procedure has nothing different as a goal than merely to preclude the micro-organisms from the further utilization which do not survive the aforementioned procedural measures.

Additionally known is to inoculate over the surviving colonies of micro-organisms in a nutrient solution and to cultivate the micro-organisms further under these circumstances.

Initially, at this point, the teaching of the present invention takes effect and consists therein that the matrix is formed of micro-organisms having the following characteristics:

The micro-organisms are either to form colonies or threads. (From this it may result also that rather than referring to the wording "micro-organism to form thread" there can be more accurately recited and more correctly stated "micro-organisms that form thread"). The micro-organisms, additionally, are to be capable of being easily filtered and cultivated. Finally, the micro-organisms are to have such a form that the ratio of the upper surface of the volume is large. This is the most general but also sufficient feature for characterizing the micro-organisms to be selected according to the method of the present invention. By way of the aforementioned combination of features there is first set forth the general direction according to which the first selection procedure is to be carried out. This inventive feature is believed to be sufficiently determined and set forth. Moreover, when micro-organisms are to be selected as taught by the invention which have an upper surface as large as possible in relation to volume there can be meant therewith only such micro-organisms of which the geometric form abstractly seen are furthest removed from the spherical form which knowingly has the smallest upper surface in relation to the volume thereof. This designation is also sufficiently set forth and determined since the micro-organisms simply do not exist in abstract but rather as stated provide a particular geometric form so that among all micro-organisms coming into consideration or involved therewith there exists one time which in fact provides a measurable largest upper surface in comparison to the volume content thereof.

Proceeding from the first general designation for the micro-organism to be used there is taught by the invention to use blue algae of the genus "oscillatoria" as the micro-organisms. The individual who wants to utilize the method according to the present invention is also provided in the description with a concrete example for the purpose with which micro-organisms the expert can use the method according to the invention in the best possible manner so far as recognizable. As a further direction there is added that out of the micro-organisms used for formation of the matrix individual cells are formed prior to the radiation. How this is to occur is set forth in the description.

As to the selection process there is to be stated additionally that the decisive inventive contribution exists in the concept that it is important to use micro-organisms with which the upper surface ratio to the volume is great (whereby, however, the previously mentioned characteristics must be considered therewith). This is based upon the knowledge that such micro-organisms can be subjected to the measures designated as the second selection procedure so that a matrix of the type under consideration can be formed therefrom. If one then goes after the aforementioned indicated step of conception of the invention, there must be admitted indisputable that everything in the specification is entirely complete and that the teaching for practicing the invention with technical action is also completely set forth.

There is not recognizable from any of the prior art that micro-organisms are to be used of a type utilized in accordance with the present invention to gain uranium from sea water. The formation of the matrix is known for cleaning contaminated water though with the invention, there is particularly set forth as a pre-condition that such a matrix can be formed and entirely aside therefrom, such cannot be recognized from the prior art as to how uranium located in strongly thin condition in sea water is to be gained.

The prior art may disclose gaining of uranium by utilization of micro-organisms though the teaching of the prior art does not go beyond what is acknowledged in the specification to belong with the state of the art. The present invention, moreover, builds upon and goes beyond the state of the art.

The expression "colonies" corresponds to the German wording and can be considered to have multiple meanings since with the word "colony" there is once meant such micro-organisms which form from so-called colonies under the conditions or facets under consideration and in contrast hereto also meaning single-cell micro-organisms and also micro-organisms remaining as a single cell or also forming threads or filaments. The colony-forming micro-organisms, however, have imminent the characteristic that they form such colonies.

The expression "colony", however, is also used for a batch of single-cell micro-organisms which grow up upon a solid nourishing ground, also remaining there, because they cannot move away. This is watched in the selection of the text wording. However, the present specification actually does not leave any doubt at all whether the concept utilized is to be considered in one sense or another. There must be maintained, however, that teaching of the present invention is not at all the growth of colonies or filament-forming micro-organisms, but rather the utilization of such micro-organisms after selection thereof for producing a matrix with the goal or object to use this matrix for gaining uranium from sea water. The pre-treated micro-organisms used according to the invention and in a particular manner to be considered once again in the following paragraphs are additionally to be easily capable of being filtered and cultivated as provided according to the teaching of the present invention. Additionally such micro-organisms are to be used which provide a ratio of upper surface to volume which is as large as possible.

The conception that for this purpose only a limited number of concrete micro-organisms have been disclosed which provide the aforementioned characteristics may be true, though a limitation as to the utilization of the micro-organisms set forth only as an example would not be justified with respect to the teaching of the present invention, especially when being in a position ready at any time to set forth further examples.

Comment may be made that the statement is indefinite that the ratio of the upper surface to the volume should be as large as possible. There must be considered as belonging to the teaching provided for the first time by the present invention recognized that micro-organisms with which the ratio of the upper surface with respect to the volume thereof is large, are more suitable for the intended or provided purpose than micro-organisms with equal volume content but smaller upper surface. The present invention is not based thereon to carry out particular measures for growing micro-organisms with an upper surface larger than the volume, but rather the present invention is based thereon to assure that with the selection of micro-organisms primarily micro-organisms are used having a greater upper surface with equal volume. The teaching according to the present invention, however, is that under predetermined preconditions, namely on the basis of the utilized selection procedure set forth in description as to the stability of micro-organisms compared with uranium particularly those colonies and filament-forming micro-organisms are selected which are compatible with uranium and capable of taking up uranium. The present invention additionally provides still further teaching to select those micro-organisms of the aforementioned type with which the ratio of the upper surface to the volume is as large as possible.

Accordingly, there is stated nothing other than that in accordance with the present invention it is important that from the micro-organisms which were subjected previously to the aforementioned selection process that particularly those are to be used with the greater upper surface compared with the volume thereof. This distinction is being stated as bluntly as possible to avoid any possible future misunderstanding and to clarify the meaning of the present invention. Certainly, there is welcomed if on the basis of the measures undertaken in accordance with the teaching of the present invention, micro-organisms result having enlarged upper surface. This, however, is not the teaching of the inventive measures.

Comment may exist that no example of the selection process has been provided and accordingly attention once again is directed to the fact that this is not the teaching of the present invention. Attention is directed to the statements in U.S. Pat. No. 4,039,445-Heide et al, issued Aug. 2, 1977 and belonging to the assignee of the present invention on page 3 thereof etc. as well as the sample embodiment provided therewith. A German disclosure No. 24 41 479-Heide et al corresponds to the U.S. Pat. No. 4,039,445.

Moreover, these statements primarily pertain to gaining uranium compatible single cell green algae is also usable for the algae under consideration here. For this purpose, reference is also made to the statements in the aforementioned U.S. Pat. No. 4,039,445-Heide et al.

It is, of course, to be understood that the present invention is, by no means, limited to the specific example set forth above but also comprises any modifications within the scope of the appended claims.

What is claimed is:

1. A selective method of producing a matrix of cultivatable micro-organisms for extracting uranium from sea water, comprising in combination the process steps of: exposing micro-organisms to x-rays to form irradiated micro-organisms and mutants from individual cells of micro-organisms found in nature which are easily filtered and cultivated and having a ratio of surface to volume as large as possible and specifically micro-organisms that both form colonies and are filamentous, placing the thus irradiated micro-organisms upon a nutrient medium rich in uranium and leaving said micro-organisms thereon until surviving colonies of mutants form, inoculating the surviving colonies of mutants in a nutrient solution, and further cultivating the surviving colonies of mutants to thereby obtain a cell matrix of micro-organisms having stability of micro-organisms compared with uranium as well as capability thereof for taking up uranium, particularly those colonies and filament-forming micro-organisms being selected which are compatible with uranium and capable of taking up uranium.

2. A method of producing a matrix of cultivatable micro-organisms for extracting uranium from sea water comprising in combination the process steps of: exposing micro-organisms to X-rays to form irradiated micro-organisms and mutants from individual cells of micro-organisms found in nature which are easily filtered and cultivated and having a ratio of surface to volume as large as possible and specifically micro-organisms that form colonies and are micro-organisms that form threads, placing the thus irradiated micro-organisms upon a nutrient medium rich in uranium and leaving said micro-organisms until surviving colonies of mutants form, inoculating the surviving colonies of mutants in a nutrient solution, and further cultivating the surviving colonies of mutants to thereby obtain a cell matrix of micro-organisms, and utilizing blue algae of the type oscillatoria found in nature as matrix micro-organisms.

3. A method according to claim 2, which includes the step of prior to exposing said micro-organisms to X-rays forming individual cells from said micro-organisms.

4. A method according to claim 2, which includes the steps of: placing the micro-organism matrix into a filter cage, and passing uranium-containing sea water through said matrix in the filter cage.

5. A method according to claim 2, in which the predetermined micro-organisms found in nature are exposed to X-rays for a period of about one hour.

6. A selective method of producing a matrix of cultivatable micro-organisms for extracting uranium from sea water, comprising the process steps of: exposing micro-organisms to X-rays to formm irradiated micro-organisms and mutants from individual cells of micro-organisms found in nature which are easily filtered and cultivated and having a ratio of surface to volume as large as possible and specifically selected from the group consisting of filamentous micro-organisms that form colonies, placing the thus irradiated micro-organisms upon a nutrient medium rich in uranium and leaving said micro-organisms thereon until surviving colonies of mutants form, inoculating the surviving colonies of mutants in a nutrient solution, further cultivating the surviving colonies of mutants to thereby obtain a cell matrix of micro-organisms, and utilizing blue algae of the type oscillatoria found in nature as matrix micro-organisms.

7. A method according to claim 6, which includes the steps of: placing the micro-organism matrix into a filter cage, and passing uranium-containing sea water through said matrix contained in the filter cage.

8. A method according to claim 6, in which the micro-organisms found in nature are exposed to X-rays for a period of about one hour.

9. In a method of producing a matrix of cultivatable micro-organisms, with which these micro-organisms are irradiated by means of X-ray beams whereupon the irradiated micro-organisms are brought upon nutrient medium rich in uranium content and are left thereon until formation of colonies occurs followed by inoculating the surviving colonies of mutants in a nutrient solution, the improvement in combination therewith which comprises using micro-organisms having a ratio of surface to volume as large as possible and forming colonies and fibers as well as being easily filterable and cultivatable and also having stability of micro-organisms compared with uranium as well as capability thereof for taking up uranium, particularly those colonies and filament-forming micro-organisms being selected which are compatible with uranium and capable of taking up uranium.

* * * * *